US00RE38165E

(19) United States
(12) Reissued Patent
Macken

(10) Patent Number: US RE38,165 E
(45) Date of Reissued Patent: Jul. 1, 2003

(54) LASER SCANNING SYSTEM WITH REFLECTING OPTICS

(75) Inventor: John A. Macken, Santa Rosa, CA (US)

(73) Assignee: Optical Engineering, Inc., Santa Rosa, CA (US)

(21) Appl. No.: 09/136,710

(22) Filed: Aug. 19, 1998

Related U.S. Patent Documents

Reissue of:
(64) Patent No.: 5,561,544
Issued: Oct. 1, 1996
Appl. No.: 08/398,738
Filed: Mar. 6, 1995

(51) Int. Cl.[7] ..... G02B 26/08
(52) U.S. Cl. ..... 359/201; 359/202; 359/208; 359/212
(58) Field of Search ..... 359/201, 202, 359/208, 211, 212, 214, 222, 223, 850, 856–859, 861–865

(56) References Cited

U.S. PATENT DOCUMENTS

| | | | | |
|---|---|---|---|---|
| 4,160,939 | A | * | 7/1979 | Damouth et al. |
| 4,232,960 | A | * | 11/1980 | Glab |
| 4,388,651 | A | * | 6/1983 | Sherman |
| 4,461,947 | A | | 7/1984 | Ward |
| 4,469,931 | A | | 9/1984 | Macken |
| 4,755,999 | A | | 7/1988 | Macken |
| 4,921,338 | A | | 5/1990 | Macken et al. |
| 4,941,731 | A | | 7/1990 | Macken |
| 5,142,119 | A | | 8/1992 | Hillman et al. |
| 5,155,323 | A | | 10/1992 | Macken |
| 5,206,763 | A | | 4/1993 | Macken et al. |
| 5,237,149 | A | | 8/1993 | Macken |
| 5,274,492 | A | * | 12/1993 | Razzaghi |
| 5,276,546 | A | * | 1/1994 | Palm et al. |
| 5,528,613 | A | | 6/1996 | Macken et al. |
| 5,539,180 | A | | 7/1996 | Mori et al. |
| 5,618,452 | A | | 4/1997 | Matubara et al. |

FOREIGN PATENT DOCUMENTS

| | | |
|---|---|---|
| DE | G 94 07 288.4 | 9/1994 |
| EP | 0 476 965 A2 | 9/1991 |
| FR | 0 199 650 | 10/1986 |

* cited by examiner

*Primary Examiner*—James Phan
(74) *Attorney, Agent, or Firm*—Brooks & Kushman P.C.

(57) ABSTRACT

A laser beam scanning system which utilizes all reflective optics. The scanning system has a variable scan angle and focal length. The variable focal length in the reflecting optical system is achieved by simultaneously moving two perpendicular mirrors.

8 Claims, 2 Drawing Sheets

LASER SCANNING SYSTEM WITH REFLECTING OPTICS

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to laser equipment which can both scan a laser beam and adjust the optical path to achieve a variable focal length of the laser beam.

2. Description of Prior Art

Laser scanning systems typically utilize galvanometer motors to change the angle of scanning mirrors. Usually the X and Y direction is scanned by separate motors. In many applications a laser beam is scanned on a work piece. To achieve a high power density, the laser beam is usually focused on this work piece. Specialized lens have been developed to achieve a good focus on a flat surface work piece even at a high transmission angle. However, some applications require that the laser beam can be independently focused to accommodate a contoured surface. Normally this focusing is accomplished by translating one or more lenses in an optical system to achieve a variable focal length. Unfortunately, high powered $CO_2$ lasers can cause a thermal distortion in lenses which degrades the quality of the laser beam. Furthermore, lenses are not as durable as metal mirrors for high power laser beam applications. Therefore, it is desirable to utilize all reflective optic components for high power $CO_2$ laser applications. Here a problem arises when making a scanning system with a variable focal length. A change in the focal length requires a change in the optical path length. With reflective optics, a path length change usually also produces an undesirable steering of the beam. The invention presented here is an all reflective laser scanning system where a focus adjustment can be made with a minimum of translationable motion and also without introducing any steering or translation of the laser beam.

SUMMARY OF THE INVENTION

The present invention is a laser scanning system with reflective optics. To achieve an adjustable focal length on the scanned laser beam it is necessary to produce an optical path length change between two mirrors which exhibit optical power (curved mirror surfaces). To achieve this, two additional flat mirrors oriented perpendicular to each other, are placed in the optical path between the curved mirrors. A displacement of the two perpendicular mirrors in a predetermined direction will change the optical path length between the curved mirrors and in turn produce an adjustable force in the scanned beam without producing additional deviation to the scanned beam.

DESCRIPTION OF PREFERRED EMBODIMENTS

Figure 1:
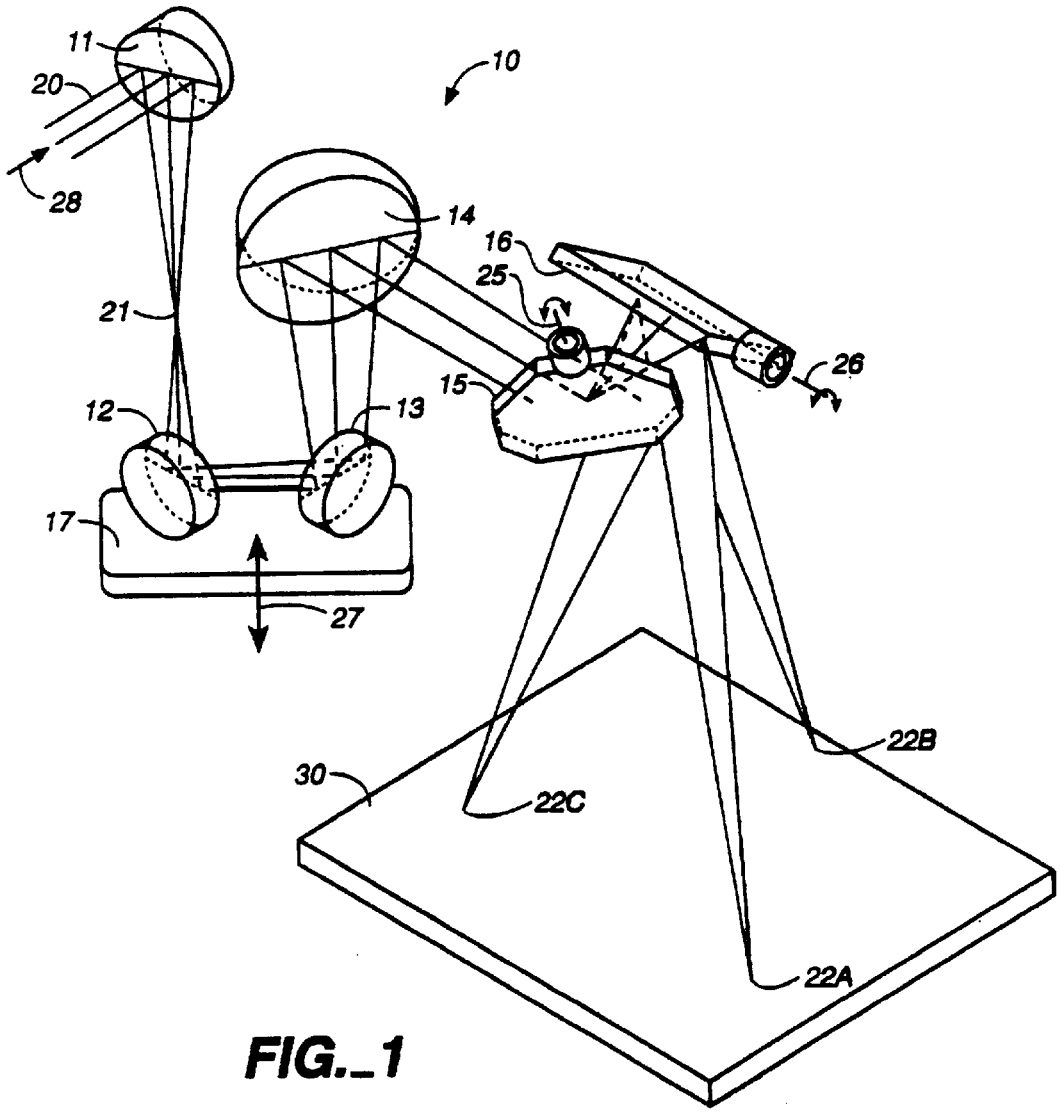
FIG. 1 is a perspective view of an all reflective laser scanning system.

FIG. 1 shows a perspective view of an all reflective scanning system 10. A laser beam 20 propagating in the direction of arrow 28 strikes a curved reflector 11. In this illustration, reflector 11 is preferably an off axis parabola which focuses laser beam 20 to a focal point 21. This laser beam then strikes flat mirrors 12 and 13. The laser beam then strikes curved mirror 14. This curved mirror 14 is preferably an off axis ellipse. The laser beam then proceeds to strike scanning mirrors 15 and 16. These scanning mirrors can be rotated to steer the beam. For example, mirror 15 can be rotated around the axis 25 and mirror 16 can be rotated around axis 26. A single scanning mirror could also be used. FIG. 1 illustrates the laser beam coming to a focus at three alternative focal spots designated 22A, 22B, or 22C. These are just used for illustration. The laser beam would only strike one point at a time. The actual focal point (22) will be referred to as the "external focus" because [is] *it* lies outside the optical components.

In FIG. 1, work piece 30 is illustrated as being a generally flat plate. To bring a laser beam to a focus, on even a flat surface, requires a focal length adjustment to compensate for the path length change introduced by a change in the deflection angle. If the work piece 30 had a contoured surface, the range of the focal length adjustments would be even greater. In FIG. 1, mirrors 12 and 13 are approximately perpendicular to each other and mounted on base 17. These mirrors can be translated in a direction 27 while retaining their approximately relative orientation. Direction 27 is generally parallel to the beam propagation direction between focal point 21 and the center of the beam striking mirror 12. The four mirrors 11, 12, 13, and 14 can be referred to as the 1st, 2nd, 3rd, and 4th mirrors respectively.

Figure 2:
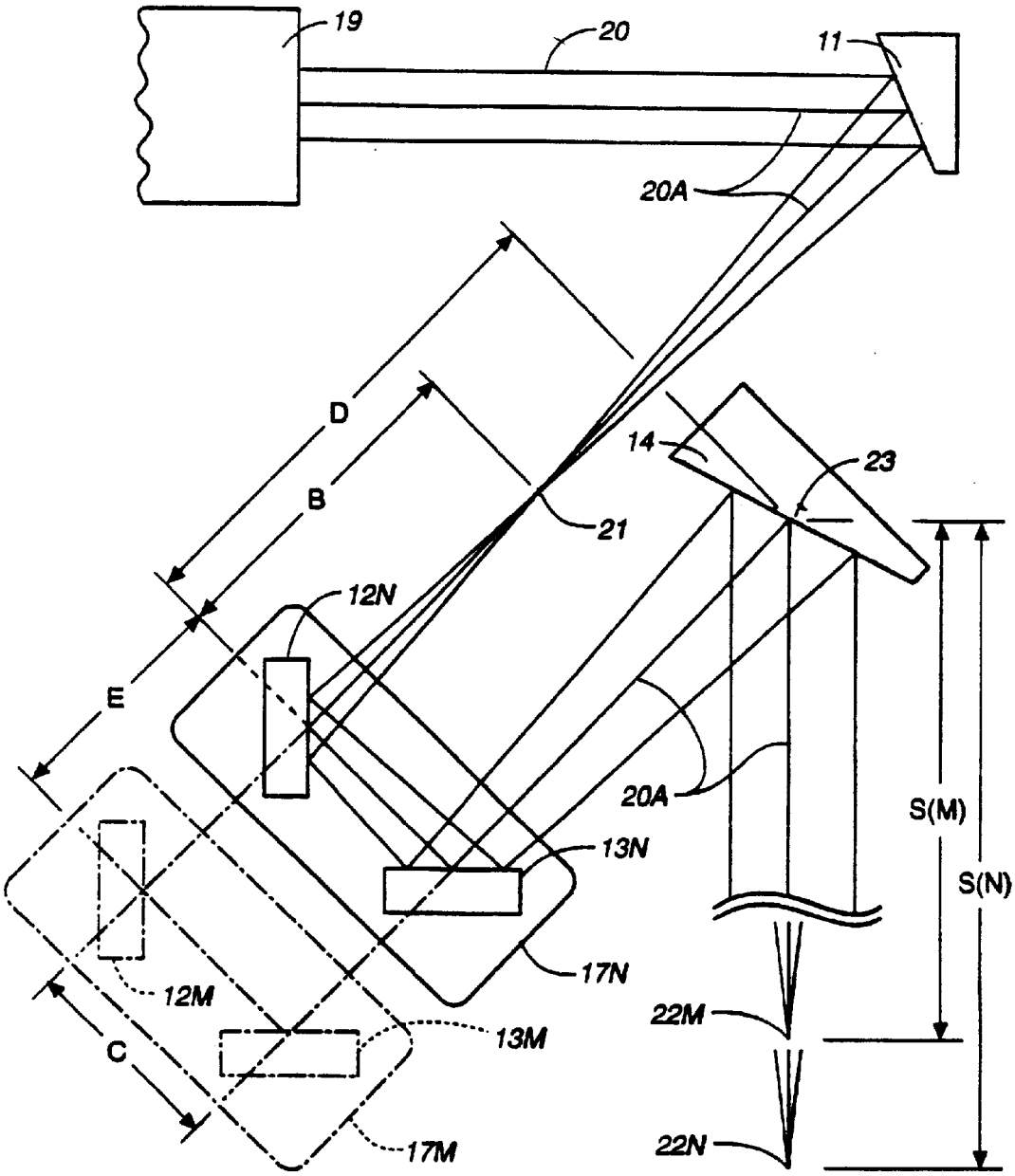
FIG. 2 is a top view of an all reflective laser scanning system illustrating the optical components prior to the scanning mirrors.

FIG. 2, is the top view of a portion of the scanning system depicted in FIG. 1. In FIG. 2, laser 19 can be seen. Also, laser beam 20 is shown to have a ray 20A which will be referred to as the "center line optical path". In FIG. 2, mirrors 12 and 13 as well as base 17 are shown in two different possible positions. These two positions are differentiated by adding the letters N or M to the numbers 12, 13, and 17. The translation required to produce this new position is distance E depicted in FIG. 2. FIG. 2 also shows point 23 which is defined as being the point at which the center line optical path 20A strikes mirror 14. Also, the distance from the focal point 21 to mirror 12 along the center line optical path is shown as being distance B. Furthermore, the center line optical path distance between mirror 13 and mirror 14 is defined as being distance D. The center line optical path between mirrors 12N and 13N or 12M and 13M is shown as being distance C. Finally, the center line optical path between the fourth mirror (point 23) and the external focal point 22M is shown being distance S(M). This focal point occurs when the mirror positions 12M and 13M are used. When mirror positions 12N and 13N are used, then focal point 22N is obtained at a distance of S(N) from point 23. The distance between focal points 22N and 22M [S(N)–S(M)] is not shown to scale when compared to displacement distance E depicted in FIG. 2. In fact, one of the advantages of placing the folding mirrors 12 and 13 in the optical path between mirror 11 and mirror 14, is that this location produces the largest possible change in focal length [S(N)–S(M)] for the smallest change in distance E. Also scanning mirrors 15 and 16 are shown in FIG. 1 but not shown in FIG. 2.

The center line optical path length between focus 21 and point 23 will be referred to as "s". Therefore, s=B+C+D when mirrors 12 and 13 are in locations depicted in FIG. 2 as 12N and 13N. When these mirrors are moved to locations 12M and 13M, then s=B+E+C+E+D. Concave mirror 14 has an effective focal length "F" which is defined as being the focal length of a mirror when focusing parallel light. When the incident light is not parallel then the formula is:

$$1/s+1/S=1/F$$

Distance S is defined as the optical path length to the external focal point 22 from the point 23. That is the predetermined portion of the laser beam which is scanned by scanning mirrors 15 and 16. The object of this invention is to prevent the focus adjustment from introducing a substantial scanning of this predetermined portion of the laser beam. For $CO_2$ laser applications, the angle steering introduced by a change in the external focus should be kept less than 3 milliradians for each 10% change in distance S. Properly translating mirrors 12 and 13 in direction 27 (FIG. 1) while maintaining the perpendicular orientation will achieve this goal.

In FIG. 2, the optical rays are drawn presuming mirror 11 is a concave off axis parabola. Another possibility would be for mirror 11 to be a convex off axis parabola. If this was the case, then the rays reflecting off mirror 11 would appear to be diverging from mirror 11. These diverging rays would appear to come *to* a virtual focus point behind mirror 11 and distance B would be measured from that virtual focus point. Focal point 21 would then be defined as this virtual focal point. Therefore, in either case it can be said that mirror 11 is a curved surface. Mirror 14, however, must always be a concave curved surface in order to function properly. It should be understood that the preferred curvature for mirror 14 is an off axis ellipse. However, it should be understood that less ideal curvatures may also do an adequate job. For example, a spherical surface on mirror 14 would produce a larger focus spot. However, a larger diameter focus spot may still be adequate to perform the desired function. Therefore, in general, mirror 14 can be referred to as a concave curved surface. Similarly, mirror 11 has been referred to as an off axis parabola. This is the preferred surface if laser beam 20 is generally parallel as illustrated. An off axis ellipse would be the preferred surface if laser beam 20 was either convergent or divergent. However, once again, other curved surfaces such as a spherical surface could also produce acceptable results.

While there has been shown and described a preferred embodiment it is to be understood that other modifications may be made without departing from the spirit and scope of the invention.

I claim:

1. A laser beam scanning system which includes at least one scanning mirror which angularly steers a predetermined portion of a laser beam, the improved features comprising:

said laser beam has a center line optical path which sequentially propagates to a first mirror, a second mirror, a third mirror, a fourth mirror, said at least one scanning mirror and then propagates to an external focal point;

said first mirror is a curved mirror;

said second and said third mirror are generally flat mirrors oriented approximately perpendicular to each other;

said fourth mirror is a concave curved mirror;

said second and said third mirror are mounted such that they can be simultaneously translated in a predetermined direction while retaining said orientation;

said center line optical path has a beam segment of length S which extends from said fourth mirror to said external focal point;

said simultaneous translation of said second and said third mirrors in said predetermined direction produces a change in said distance S while producing an angular steering of said laser beam of less than 3 milliraidans for a 10% change in said direction S for said beam segment.

*2. An all-reflective high power laser beam scanning system with an adjustable focal length which includes at least one scanning mirror to angularly steer a predetermined portion of a laser beam along an optical path to a workpiece, comprising:*

*a first reflective surface in the optical path of the laser beam and curved sufficiently to focus the laser beam at a first focal point;*

*a pair of second reflective surfaces in the optical path spaced from said first focal point and translatable sufficiently in a predetermined direction to adjust the focus of the laser beam at a second focal point; and*

*a third reflective surface optically between said pair of second reflective surfaces and said second focal point and before the at least one scanning mirror to reflect the focused laser beam to be steered and to focus the second focal point;*

*said optical path having a beam segment of predetermined distance which extends from said third reflective surface to said second focal point;*

*said translation of said pair of second reflective surfaces in said predetermined direction changing the length of said optical path from said third reflective surface to said second focal point to change said predetermined distance whereby to adjust the focus of the beam being steered without producing significant angular deviation to the steered beam at the workpiece.*

*3. The all-reflective high power laser beam scanning system of claim 2 wherein said pair of second reflective surfaces is simultaneously translatable in said predetermined direction.*

*4. The all-reflective high power laser beam scanning system of claim 2 wherein said third reflective surface is curved sufficiently to focus the laser beam at said second focal point.*

*5. The all-reflective high power laser beam scanning system of claim 2 wherein the curvature of said first and third reflective surface is off-axis.*

*6. The all-reflective high power laser beam scanning system of claim 2 wherein said first, second and third reflective surfaces are mirrors.*

*7. The all-reflective high power laser beam scanning system of claim 2 wherein said first focal point is internal and said second focal point is external.*

*8. An all-reflective high power laser beam scanning system with an adjustable focal length which includes at least one scanning mirror to angularly steer a predetermined portion of a laser beam along an optical path to a workpiece at an external focal point, the features comprising:*

*a first mirror in the optical path of the laser beam and curved sufficiently as an off-axis parabola to focus the laser beam at an internal focal point;*

*a pair of flat mirrors oriented approximately perpendicular to each other in the optical path spaced from said internal focal point and translatable sufficiently simultaneously in a predetermined direction to adjust the external focal point; and*

*a fourth mirror optically between one of said pair of mirrors and said external focal point to reflect the focused laser beam being steered, and curved sufficiently as an off-axis ellipse to focus the external focal point;*

*said optical path having a beam segment of predetermined distance which extends from said fourth mirror to said external focal point;*

*the translation of said pair of mirrors in said predetermined direction changing the length of said optical path from said fourth mirror to said external focal point to change said predetermined distance whereby to adjust the focus of the beam being steered without producing significant angular deviation to the steered beam at the workpiece.*

* * * * *